R. HAM.
Stovepipe Damper.

No. 95,340.  Patented Sept. 28, 1869.

WITNESSES:
C. D. Kellum
William J. Keep

INVENTOR:
Robt. Ham

United States Patent Office.

ROBERT HAM, OF TROY, NEW YORK, ASSIGNOR TO PHILO P. STEWART, OF SAME PLACE.

Letters Patent No. 95,340, dated September 28, 1869.

STOVE-PIPE DAMPER.

The Schedule referred to in these Letters Patent and making part of the same.

*To all whom it may concern:*

Be it known that I, ROBERT HAM, of the city of Troy, in the county of Rensselaer, and State of New York, have invented a new and improved "Stove-Pipe Damper;" and I do hereby declare the following to be a full, clear, and exact description of the same, reference being hereby had to the accompanying drawings, which form and make a part of this, my specification, in which—

Letters of like name and kind refer to like parts in each of the figures.

The nature of my invention consists in forming a stove-pipe damper with pivots, secured at equidistant points upon opposite sides of the same, constructed in the form of a cone, with its apex outward, or with a shoulder, from which projects outward a journal having parallel sides, so as to permit said pivots to be inserted in the apertures in said pipe from the inside, and, by causing the damper to slightly spread the pipe, enable said damper to be secured in any position by the inward spring of said pipe against said shoulders or conical pivots.

In the annexed drawing—

A represents the stove-pipe of usual form and construction.

The damper B is a flat circular disk of metal, of usual size and form, and has secured, at equidistant points upon its periphery, two pivots, $c$ and $c'$, which pass through corresponding openings in said pipe, and form axial bearings for said damper.

Figure 1:
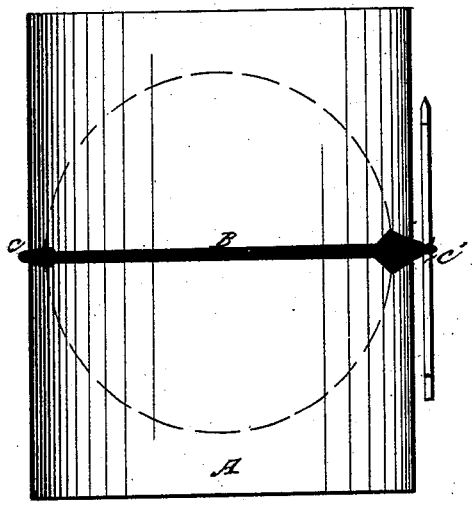
Figure 1 is a longitudinal section of the stove-pipe and damper.
Figure 3:
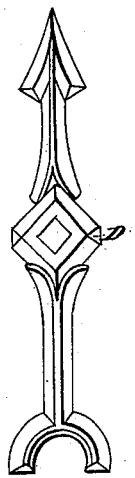
Figure 3 is an enlarged front elevation of the indicator.
Figure 2:
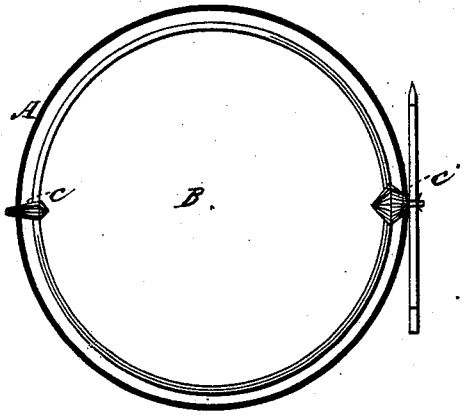
Figure 2 is a cross-section of the same.
Figure 4:
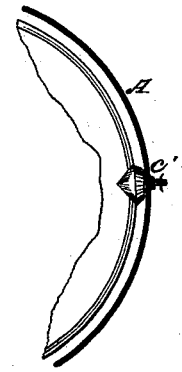
Figure 4 is a broken cross-section of the pipe and damper, showing a modification of the form of the pivot.

These pivots may be of any desired shape, either conical, as shown in figs. 1 and 2, or with parallel sides and a shoulder, as seen in fig. 4, but must be smallest at their outer ends, so as to pass through the openings in the pipe from the inside.

When constructed in the form shown in fig. 4, the distance between the shoulders should be a little more than the inside diameter of the pipe, the spring of which, when the damper is in place, will cause sufficient friction upon said shoulders to hold said damper firmly in whatever position it may be placed; but when the conical pivots are used, the holes in said pipe should be of sufficient size, only, to admit the points of said pivots, after which the sides of said pipe may be brought into proper position by placing a set over one of said pivots, and striking a slight blow with a hammer upon said set, which will spread the holes and force the sheet-metal inward.

The manner of attaching the damper to the stove-pipe is as follows, viz:

Suitable holes or apertures being made in opposite sides of the pipe, the damper B is placed edgewise within said pipe, and the long pivot $c'$ caused to enter one of the holes.

By springing the sides of the pipe (opposite from the holes) inward, the damper may be pressed downward until the opposite pivot $c$ enters the hole, when the pipe will return to its shape and firmly hold said damper. The indicator can now be attached, and the damper used.

Another and an easier manner of placing the damper, is to make but one hole in the pipe, into which the long pivot $c'$ is inserted, as before, and said damper pressed downward until in proper position within said pipe, when, by a slight blow of the hammer upon the outside of said pipe, the position of the pivot $c$ will be indicated, and it may be forced through the sheet-metal by means of a set, in the usual manner.

It will be readily seen that the above-described damper is cheaper, more durable, and convenient than any other in use, as the disk and pivots can be cast in one piece instead of in two parts, as usually made; the damper can be more quickly applied to the pipe, where it is not liable to get out of order, and, when adjusted, is held in place by the spring of the pipe, which causes sufficient friction upon the pivots to overcome the force of the draught.

Having thus fully set forth the nature and merits of my invention,

What I claim as new, and desire to secure by Letters Patent, is—

The damper B, having cast or otherwise attached thereto the pivots $c$ and $c'$, so constructed as to permit of their insertion into the pivot-holes from within the pipe, and provided with shoulders or their equivalents, against which the inside of said pipe shall press, substantially as and for the purpose herein shown and described.

In testimony whereof, I have hereunto set my hand, this 16th day of January, A. D. 1869.

ROBT. HAM.

Witnesses:
C. D. KELLUM,
W. J. KEEP.